United States Patent [19]

Tabuchi et al.

[11] 4,455,127
[45] Jun. 19, 1984

[54] COMPACT SIZE PLUNGER PUMP

[75] Inventors: Toshiaki Tabuchi; Yoichi Shimazawa, both of Nara, Japan

[73] Assignee: Sharp Kabushiki Kaisha, Osaka, Japan

[21] Appl. No.: 447,193

[22] Filed: Dec. 6, 1982

Related U.S. Application Data

[63] Continuation of Ser. No. 173,880, Jul. 31, 1980.

[30] Foreign Application Priority Data

Aug. 3, 1979 [JP] Japan .................................. 54-99644

[51] Int. Cl.³ ......................... F04B 17/04; F04B 21/06
[52] U.S. Cl. ...................................... 417/418; 417/439
[58] Field of Search ........................ 417/439, 417, 418

[56] References Cited

U.S. PATENT DOCUMENTS 3,208,394  9/1965  Taplin ................................. 417/439
4,270,133  5/1981  Shimazawa ..................... 346/140 R
4,272,225  6/1981  Fujinaka et al. .................... 417/417

*Primary Examiner*—Richard E. Gluck
*Assistant Examiner*—Peter M. Cuomo
*Attorney, Agent, or Firm*—Birch, Stewart, Kolasch & Birch

[57] ABSTRACT

An ink liquid supply system for an ink jet system printer includes an ink liquid reservoir for containing ink liquid therein, and a compact size plunger pump for supplying the ink liquid to a nozzle. The compact size plunger pump integrally includes three pressure chambers defined by coaxially connected pistons. The pistons are driven to reciprocate by a plunger associated with an electro-magnetic solenoid. The first pressure chamber functions to introduce the ink liquid from the ink liquid reservoir and develop the ink liquid toward the nozzle. The third pressure chamber functions to introduce an ink liquid collected by a beam gutter of the ink jet system printer for returning the ink liquid to the ink liquid reservoir. The second pressure chamber functions as a damper for decelerating the shift movement of the pistons and plunger, thereby reducing the shock which will be created when the plunger is attracted by the electromagnetic solenoid.

2 Claims, 3 Drawing Figures

COMPACT SIZE PLUNGER PUMP

This application is a continuation of copending application Ser. No. 173,880, filed on July 31, 1980.

BACKGROUND AND SUMMARY OF THE INVENTION

The present invention relates to an ink liquid supply system for an ink jet system printer of the charge amplitude controlling type and, more particularly, to a constant flow rate pump for use in the ink liquid supply system.

A constant flow rate ink liquid supply pump is highly required in an ink jet system printer of the charge amplitude controlling type to ensure an accurate printing operation. The constant flow rate pump is effective not only to stabilize the ink liquid speed emitted from a nozzle but also to maintain the ink visosity at a fixed value.

A constant flow rate ink liquid supply pump having a plurality of pressure chambers is proposed in our copending application Ser. No. 51,395, "CONSTANT FLOW RATE LIQUID SUPPLY PUMP", filed on June 25, 1979 now U.S. Pat. No. 4,343,596. The constant flow rate pump of U.S. Pat. No. 4,343,596 includes a cam mechanism for converting the rotation of a motor to a reciprocating movement, thereby driving a piston. However, the cam mechanism which is required, complicates the system construction.

To eliminate the disadvantages caused by the cam mechanism, a novel constant flow rate ink liquid supply pump is proposed in copending application Ser. No. 70,639, "CONSTANT FLOW RATE LIQUID SUPPLY PUMP" filed on Aug. 28, 1979 by Masafumi Matsumoto and Matahira Kotani now U.S. Pat. No. 4,278,984, and assigned to the same assignee as the present application, wherein an electromagnetic solenoid is employed to drive the piston. This system is superior to the cam mechanism controlled pump because the piston is driven directly by a plunger associated with the electromagnetic solenoid.

However, the solenoid controlled pump inevitably requires a stopper for determining the stroke length of the piston. The stopper makes contact with the plunger when the plunger is driven in a predetermined direction by a preselected length and noises are created when the plunger contacts the stopper at a high speed. Moreover, the impact will cause a deviation in the preselected stroke length, and the deviation will preclude the desired constant flow rate supply.

Accordingly, an object of the present invention is to provide a compact size plunger pump for use in an ink liquid supply system of an ink jet system printer of the charge amplitude controlling type.

Another object of the present invention is to provide a plunger pump which ensures a constant flow rate liquid supply and creates substantially low noises.

Still another object of the present invention is to provide a novel ink liquid supply system in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a pump integrally includes at least three pressure chambers, which are separated by series connected pistons, which in turn are driven to reciprocate by a plunger associated with an electromagnetic solenoid. The first pressure chamber functions to introduce the ink liquid from an ink liquid reservoir and develop the ink liquid toward a nozzle of the ink jet system printer of the charge amplitude controlling type at a constant flow rate. The second pressure chamber functions to decelerate the movement of the piston, thereby minimizing the impact force which will be created when the plunger contacts a stopper. The third pressure chamber functions to introduce the waste ink liquid collected by a beam gutter of the ink jet system printer and return the waste ink liquid to the ink liquid reservoir.

In a preferred form, the second pressure chamber communicates with the ink liquid reservoir to introduce the ink liquid through a capillary tube conduit. When the piston reciprocates, the ink liquid filled in the second pressure chamber must be decreased or increased through the capillary tube conduit. The resistance at the capillary tube conduit functions to decelerate the piston movement, thereby minimizing the impact force.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a block diagram of an ink liquid supply system for an ink jet system printer of the charge amplitude controlling type including an embodiment of a compact size plunger pump of the present invention;

DESCRIPTION OF THE PREFERRED EMBODIMENTS

Figure 2:
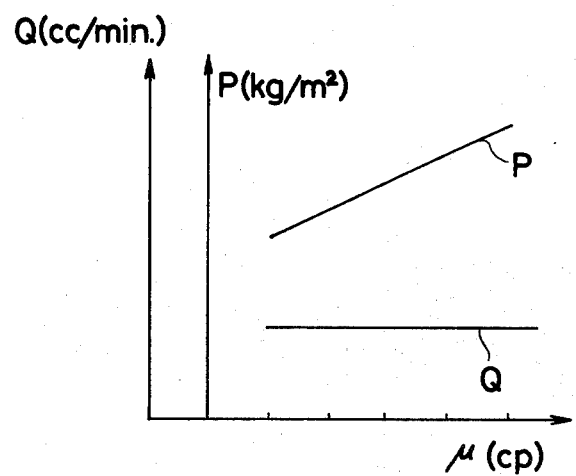
FIG. 2 is a graph for explaining an operation characteristic of the compact size plunger pump of FIG. 1.

FIG. 1 shows an ink jet system printer of the charge amplitude controlling type embodying the present invention.

The ink jet system printer mainly comprises a print forming section and an ink liquid supply system.

The print forming section 1 of the ink jet system printer of the charge amplitude controlling type comprises a nozzle 2 for emitting an ink liquid supplied from the ink liquid supply system through an electromagnetic valve 3 and a conduit 4. An electromechanical transducer 5 is attached to the nozzle 2 to vibrate the nozzle 2 at a given frequency, thereby forming ink droplets 6 at the given frequency. The thus formed ink droplets 6, which are emitted from the nozzle 2, are charged through the use of a charging electrode 7 in accordance with a print information signal. The thus charged ink droplets 6 are deflected while they pass through a constant high voltage electric field established by a pair of deflection electrodes 8 in accordance with charge amplitudes carried thereon, and directed to a record receiving paper 9. Ink droplets 6' not contributing to the actual print operation are not charged and are directed to a beam gutter 10 for recirculation purposes.

liquid collected by the beam gutter 10 is introduced into the third pressure chamber 21 through the inlet valve 52.

The pressure in the first pressure chamber 19 is increased to develop the ink liquid through the outlet valve 34. The ink liquid developed from the outlet valve 34 is passed through the pressure accumulator 37, the main filter 44, the conduit 45, the capillary tube 46 and the pressure accumulator 47, whereby the pressure pulsation is removed. The thus obtained ink liquid of the constant flow rate is applied to the nozzle 2 via the electro-magnetic valve 3 and the conduit 4 to issue the ink droplets 6.

The ink liquid contained in the second pressure chamber 20 is forced to develop through the thin opening 50. The fluid resistance created at the thin opening 50 functions to decelerate the movement speed of the plunger 26 and the first and second pistons 16 and 17. Accordingly, the shock, which occurs when the end plate 26b of the plunger 26 contacts the cover of the electro-magnetic valve 28, will be minimized. This damper operation is effective in minimizing the deviation in the constant flow rate and to reduce the noise.

When the electro-magnetic solenoid 28 is de-energized, the plunger 26, the first and second pistons 16 and 17, and the diaphragm 18 are driven to shift in the direction shown by the arrow B by the spring 32 until the end plate 26b contacts the adjusting screw 31. At this moment, the pressure in the first pressure chamber 19 is decreased to introduce the ink liquid from the ink tank 36 through the pre-filter 62, the conduit 35 and the inlet value 33. The pressure in the third pressure chamber 21 is increased to return the collected ink liquid to the ink tank 36 through the outlet valve 53 and the conduit 55.

The second pressure chamber 20 functions to introduce the ink liquid from the ink tank 36 through the thin opening 50. The fluid resistance created at the thin opening 50 functions to decelerate the movement of the plunger 26 and the first and second pistons 16 and 17. Therefore, the shock, which occurs when the end plate 26b contacts the adjusting screw 31, will be minimized. This damper operation is effective to minimize the deviation of the constant flow rate and to reduce the noise.

Since the second pressure chamber 20 is supplied with the ink liquid of the same characteristic as that to be applied to the nozzle 2, no problems arise even when ink liquid leakage occurs between the first pressure chamber 19 and the second pressure chamber 20, or between the second pressure chamber 20 and the third pressure chamber 21.

In a manner as discussed above, the ink liquid of the constant flow rate is supplied from the compact size plunger pump to the nozzle 2 as long as the electro-magnetic solenoid 28 is driven by a signal of a predetermined frequency and the electro-magnetic valve 3 is opened. The constant flow rate is determined by the frequency of the signal which activates the electro-magnetic solenoid 28 and the stroke length of the plunger 26 which is adjustable through the use of the adjusting screw 31.

In the compact size plunger pump of FIG. 1, the first piston 16 is slidably supported by the cylinder 23, and the second piston 17 is slidably supported by the second cylinder block 14. Accordingly, the ink liquid inevitably leaks through a thin gap formed between the piston and the cylinder. However, the ink liquid leakage can be ignored when the gap is substantially thin because of the following reason.

The leakage amount $\Delta Q$ in a unit time period can be expressed as follows when the gap distance and the gap length are held constant.

$$\Delta Q \propto (P_1 - P_2)/\mu$$

where:
 $P_1$ is the pressure of a higher pressure side;
 $P_2$ is the pressure of a lower pressure side; and
 $\mu$ is the viscosity of the liquid.

That is, the leakage amount is proportional to the pressure difference, and is inversely proportional to the viscosity of the ink liquid.

On the other hand, when the ink liquid of the constant flow rate is applied to the nozzle, the ink liquid pressure at the nozzle is proportional to the ink viscosity as shown in FIG. 2. Therefore, the above discussed ink liquid leakage amount is held constant even when the ink viscosity varies due to variation in the ambient condition, because the viscosity variation and the pressure variation cancel each other. Accordingly, the compact size plunger pump of FIG. 1 operates as the constant flow rate pump even when the ambient temperature varies as long as the stroke length of the plunger 26 and the driving frequency of the solenoid 28 are held constant.

Figure 3:
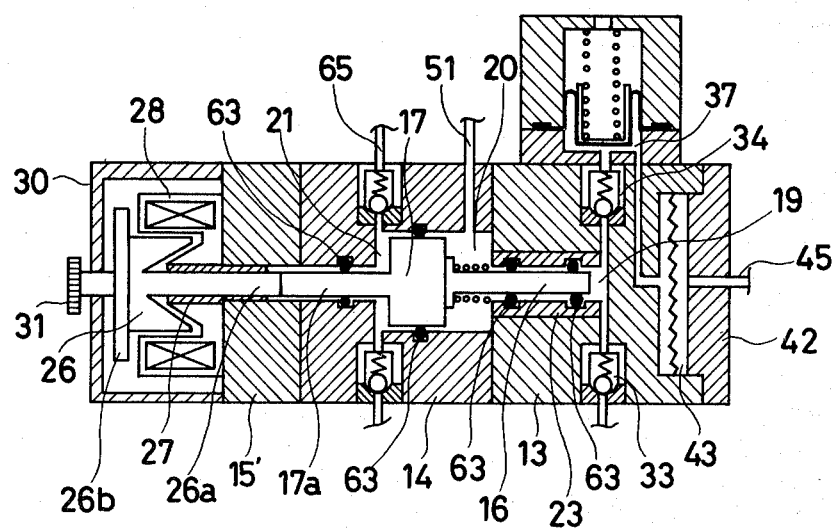
FIG. 3 is a sectional view of another embodiment of a compact size plunger pump of the present invention.

FIG. 3 shows another embodiment of the compact size plunger pump of the present invention. Like elements corresponding to those of FIG. 1 are indicated by like numerals.

O-shaped rings 63 are disposed between the first piston 16 and the cylinder 23, and between the second piston 17 and the second cylinder block 14 for slidably supporting the pistons 16 and 17 and preventing the ink liquid leakage. In this embodiment, the fourth pressure chamber 22 is omitted because the ink liquid leakage will not occur.

The invention being thus described, it will be obvious that the same may be varied in many ways. Such variations are not to be regarded as a departure from the spirit and scope of the invention, and all such modifications are intended to be included within the scope of the following claims.

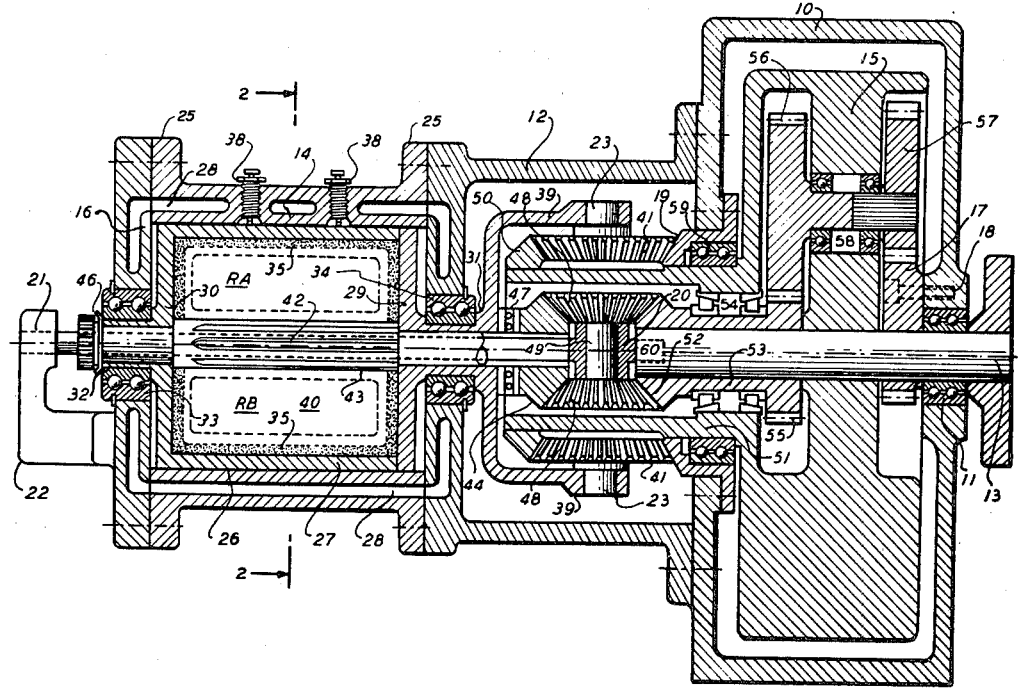

What is claimed is:

1. A compact size plunger pump comprising:
 a first cylinder block;
 a first piston disposed in said first cylinder block for determining a first pressure chamber, said first pressure chamber introducing a liquid from a reservoir and developing the liquid at a constant flow rate;
 a second cylinder block coaxially connected to said first cylinder block;
 a second piston coaxially connected to said first piston, said second piston being disposed in said second cylinder block for determining a second pressure chamber, wherein the volume of said second pressure chamber is greater than the volume of said first pressure chamber;
 a plunger coaxially connected to said second piston for reciprocating said first and second pistons within said first and second cylinder blocks;
 an electromagnetic solenoid for attracting said plunger in a predetermined direction; and
 communicating means for directly communicating said second pressure chamber to said reservoir through a thin opening which permits bi-directional liquid fluid flow so that during a pump intake stroke the liquid is filled in said second pressure chamber and a fluid resistance is created at said thin opening, thereby decelerating the reciprocating movement of said plunger and said first and second pistons.

2. An ink liquid supply system for an ink jet system printer, said ink jet system printer comprising a nozzle for emitting an ink liquid supplied from said ink liquid supply system and a beam gutter for collecting waste ink droplets emitted from said nozzle and for recovering the waste ink liquid toward said ink liquid supply system, said ink liquid supply system comprising:

an ink liquid reservoir for containing the liquid therein; and a compact size plunger pump comprising:

a cylinder block;

a first piston disposed in said cylinder block for determining a first pressure chamber;

a second piston coaxially connected to said first piston and disposed in said cylinder block for determining a second pressure chamber and a third pressure chamber, wherein the volume of said second pressure chamber is greater than the volume of said first pressure chamber;

a plunger connected to said second piston for reciprocating said first and second pistons;

an electro-magnetic solenoid for attracting said plunger in a predetermined direction;

a first inlet valve for introducing the ink liquid from said ink liquid reservoir to said first pressure chamber;

a first output valve for developing the ink liquid from said first pressure chamber toward said nozzle;

a thin opening formed in said cylinder block for directly communicating said second pressure chamber with said ink liquid reservoir for introducing ink liquid into said second pressure chamber during a pump intake stroke and for outputting ink liquid from said second pressure chamber during a pump compression stroke with a substantial fluid resistance;

a second inlet valve introducing the waste ink liquid from said beam gutter to said third pressure chamber; and a second outlet valve for returning the waste ink liquid from said third pressure chamber to said ink liquid reservoir.

* * * * *

United States Patent [19]

Seybold

[11] 4,455,128

[45] Jun. 19, 1984

[54] ROTARY INTERNAL COMBUSTION ENGINE WITH UNIFORMLY ROTATING PISTONS COOPERATING WITH REACTION ELEMENTS HAVING A VARYING SPEED OF ROTATION AND OSCILLATING MOTION

[76] Inventor: Frederick W. Seybold, 1979 Dogwood Dr., Scotch Plains, N.J. 07076

[21] Appl. No.: 330,678

[22] Filed: Dec. 14, 1981

[51] Int. Cl.³ ............................................ F02B 53/00
[52] U.S. Cl. ........................................ 418/34; 418/36
[58] Field of Search .................... 123/245; 418/33, 34, 418/36

[56] References Cited

U.S. PATENT DOCUMENTS

| 1,353,205 | 9/1920 | Woodward | 418/34 |
| 1,839,275 | 1/1932 | Sweningson | 418/34 X |
| 3,955,541 | 5/1976 | Seybold | 123/245 |
| 3,981,638 | 9/1976 | Hutterer | 418/34 |
| 4,057,374 | 11/1977 | Seybold | 418/36 |
| 4,136,661 | 1/1979 | Posson | 418/36 X |
| 4,174,930 | 11/1979 | Posson | 418/36 |

FOREIGN PATENT DOCUMENTS

| 2435823 | 2/1976 | Fed. Rep. of Germany | 418/34 |
| 160125 | 3/1921 | United Kingdom | 418/36 |

Primary Examiner—Michael Koczo

[57] ABSTRACT

A rotary internal combustion engine comprising a stationary, water cooled housing having a large cylindrical bore in which a hollow cylinder with end walls rotates at a uniform speed. On said cylinder a pair of wedge-shaped pistons is mounted diametrically opposed to a similar pair of reactor elements carried by a multiple-splined shaft, said reactor elements and said pistons forming a combustion chamber whereby a gas and air mixture is compressed prior to ignition, whereupon said reactor element moves many degrees oppositely to the uniformly rotating piston while expansion is taking place. This reverse rotation of the reactor element is produced by a gear mechanism which provides a substantial period of reverse rotation and a longer period of rotation in the same direction as the piston, but at a higher speed, whereby the burned gases will be exhausted at the reactor element approaches its mating piston and/or compresses the intake mixture of gas and air between the other pair of piston and reactor element before a second ignition takes place during one revolution of the cylinder.

7 Claims, 12 Drawing Figures